United States Patent
Ignagni (10) Patent No.: US 6,170,344 B1
(45) Date of Patent: Jan. 9, 2001

(54) PIPELINE DISTORTION MONITORING SYSTEM

(75) Inventor: Mario B. Ignagni, Roseville, MN (US)

(73) Assignee: Honeywell Inc., Morristown, NJ (US)

( * ) Notice: Under 35 U.S.C. 154(b), the term of this patent shall be extended for 0 days.

(21) Appl. No.: 09/409,301

(22) Filed: Sep. 29, 1999

(51) Int. Cl.$^7$ ...................................................... G01C 9/06
(52) U.S. Cl. ............................................................ 73/865.8
(58) Field of Search ............................. 73/865.8; 701/35, 701/36

(56) References Cited

U.S. PATENT DOCUMENTS

| | | | |
|---|---|---|---|
| 4,524,426 | 6/1985 | Levine | 33/312 |
| 4,799,391 | 1/1989 | Lara | 73/865.8 |
| 4,945,775 | 8/1990 | Adams et al. | 73/865.8 |
| 6,002,974 * | 12/1999 | Schiffmann | |

* cited by examiner

Primary Examiner—Robert Raevis
(74) Attorney, Agent, or Firm—Kris T. Fredrick (57) ABSTRACT

A pipeline distortion monitoring system equipped with an inertial system measures geometric characteristics of the pipeline, and generates signals representative of the characteristics. Additional sensor means are used to aid in correcting the signals. Corrected signals along with other characteristics yield pipeline profile characteristics used to assess pipeline distortions.

4 Claims, 3 Drawing Sheets

PIPELINE DISTORTION MONITORING SYSTEM

BACKGROUND OF THE INVENTION

The present invention relates to pipeline distortion monitoring. For either above-ground, under-ground, or submarine pipelines there is a possibility that, over time, geometric distortions may occur due to local earth heave or subsidence. If the pipeline distortion at some point becomes too large, there is the possibility of pipeline rupture with possible undesirable human safety, economic, and environmental consequences. To avoid the possibility of such undesirable consequences, a regular survey of the pipeline dedicated to assessing its geometric stability is highly desirable.

Distortion monitoring of pipelines is essential to forecasting integrity changes which allow corrective measures to be taken before actual pipeline failure occurs. Pipeline distortion monitoring has the unique objective of assessing the geometric stability of a pipeline and represents a totally different function than pipeline inspection which has as its objective the monitoring of the inner surface of a pipeline for corrosion and weld integrity. Pipeline distortion monitoring has a unique additional element distinguishing it from pipeline inspection. This is the element of time over which the pipeline shifts from one time epoch to another. Pipeline distortion monitoring requires a comparison of the present pipeline geometry to that which existed at an earlier epoch, and a determination of both the angular and linear shifts that have occurred in the pipeline at all points along its length.

A pipeline PIG is a mechanism that travels through a pipeline detecting profile, ovality, displacement of oil as well as sensing other features of the pipeline. Various prior art pipeline PIGs have relied on special hardware elements to measure distortion characteristics. Two concepts for pipeline distortion monitoring have used a strapdown attitude reference system to measure the attitude of a PIG relative to a local vertical frame of reference as the PIG traverses the pipeline, together with a secondary means which allows the attitude of the PIG relative to the pipeline to be determined. One such concept, described by Levine (U.S. Pat. No. 4,524,526), utilizes a mechanical arm which makes physical contact with the pipeline, and whose angular position with respect to the PIG body provides a measurement of the PIG attitude relative to the pipeline. A second concept, described by Adams et. al. (U.S. Pat. No. 4,945,775), utilizes sonar measurements to provide the PIG attitude relative to the pipeline. By either means, the PIG attitude relative to the local vertical frame, together with the PIG attitude with respect to the pipeline provided by the secondary means, allows the pipeline attitude relative to a local-vertical geographic frame to be determined at all points along the course of the pipeline. Comparisons with the same information at an earlier epoch then allows an assessment of pipeline distortion to be made.

Another concept applicable to pipeline distortion monitoring, described by Lara (U.S. Pat. No. 4,799,391), utilizes a set of angular rate measurements from a triad of three orthogonal gyros, and a set of linear acceleration measurements from a triad of orthogonal accelerometers to derive the curvature parameters of the pipeline along its entire course. Then, comparison of these curvature parameters with the same parameters at an earlier epoch provides an indication of pipeline geometric stability.

SUMMARY OF THE INVENTION

A strapdown inertial system is used on a pig to provide three dimensional attitude and velocity of the pig as it travels through a pipeline. The system includes an IMU and odometer to collect attitude and linear displacement data. The body to local vertical attitude of the pig is corrected for two effects to allow it to provide the desired pipeline attitude relative to the local vertical frame. The first correction is for the fixed angular offset between the IMU and the pig body while the second correction is for the maneuver induced angular offset of the pig relative to the pipeline that occurs during pipeline bends. The velocity vector of the pig is corrected for the known lever arm between the pig center of gravity and the IMU location which causes the pig velocity to be affected during angular motions of the pig. Once both the attitude and velocity vector of the pig have been corrected, they may be blended using a complementary filtering approach to yield the pipeline attitude relative to the local vertical frame. The pipeline distortion monitoring function is implemented using the derived geometric parameters of the present survey and the comparable quantities derived from a prior survey.

DETAILED DESCRIPTION OF THE PRESENT INVENTION

Figure 1:
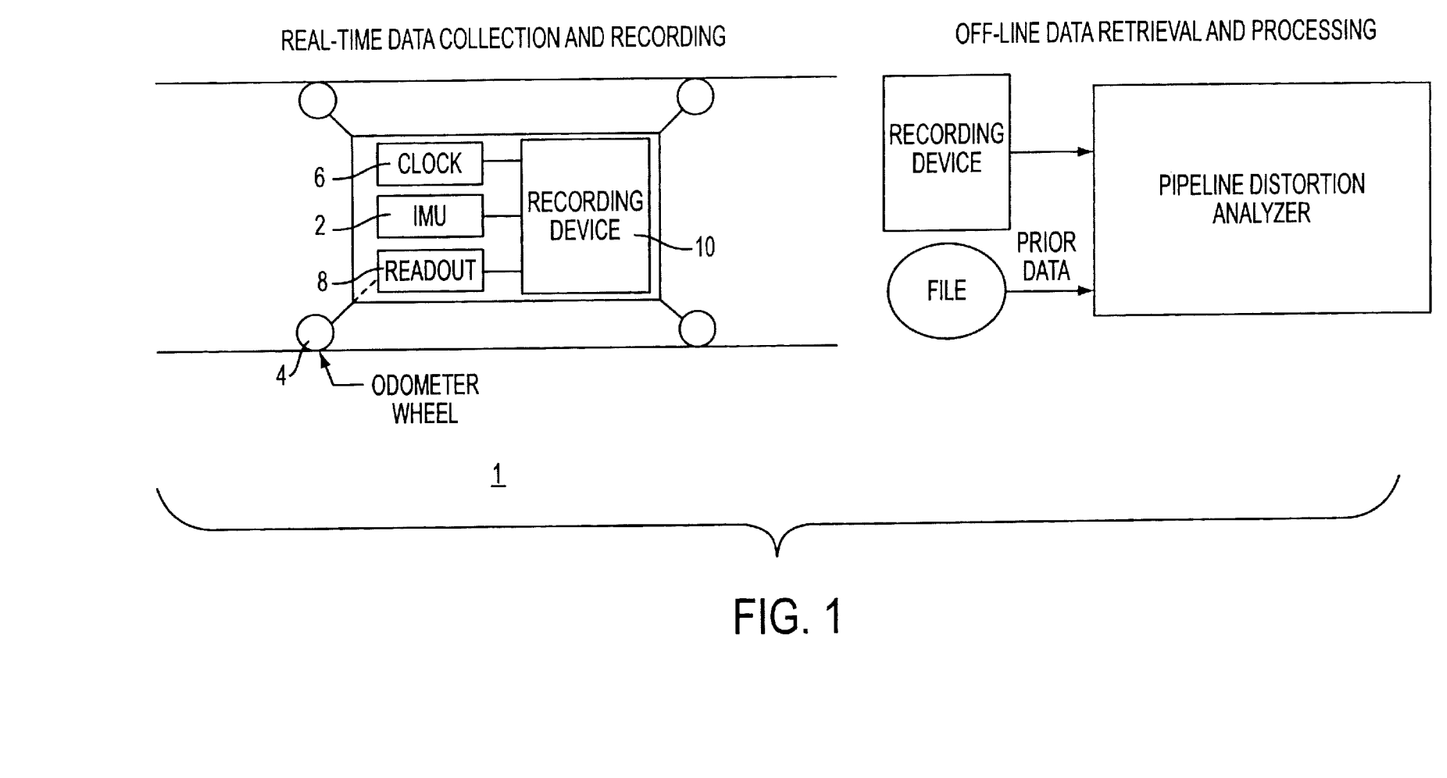
FIG. 1 shows the pipeline distortion monitoring system of the present invention.

The present invention is a system for monitoring pipeline distortion. The preferred embodiment of the invention consists of both a hardware implementation and an information processing scheme. The implementation of the concept, as defined in FIG. 1, consists of both on-board and off-board elements. The elements on-board the PIG 1 are:

An Inertial Measurement Unit (IMU) 2 consisting of a triad of gyros, a triad of accelerometers, and a digital processor that compensates the sensor outputs, and converts them into a form suitable for storage An odometer 4 that measures the incremental distance traveled by the PIG along the course of the pipeline over successive intervals of time and a readout 8 tracks the output of the odometer 4.

A clock 6 which provides accurate absolute time to be used in the subsequent data processing phase as the means of synchronizing all of the recorded data.

A recording device 10 that allows the IMU, odometer, and clock outputs to be recorded at a rate sufficient for the needs of the subsequent data processing phase.

Figure 2:
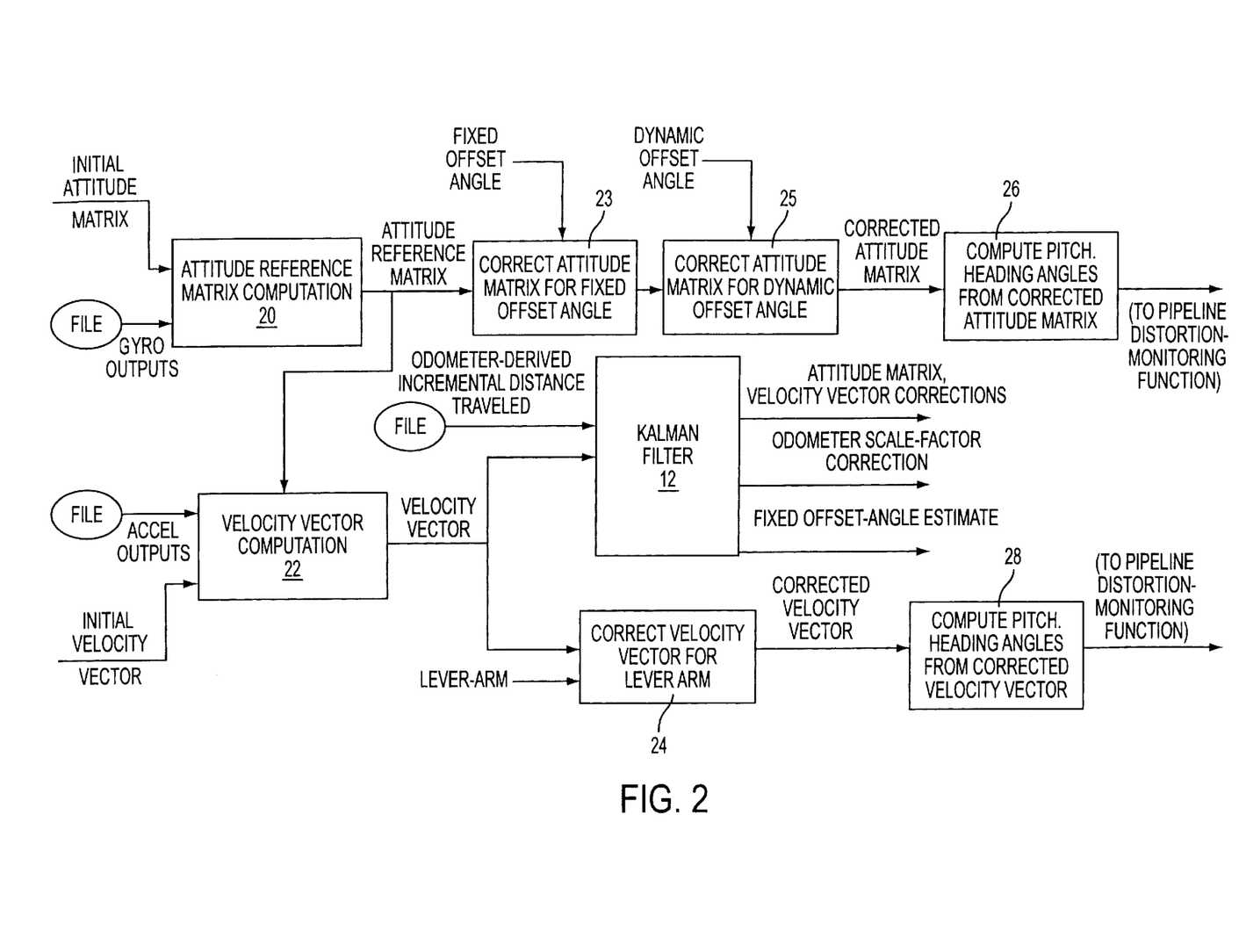
FIG. 2 shows a block diagram of the computations and corrections performed on the attitude and incremental distance traveled data collected from the IMU and the odometer to create pitch, heading angles from the attitude and incremental distance traveled data.
Figure 3:
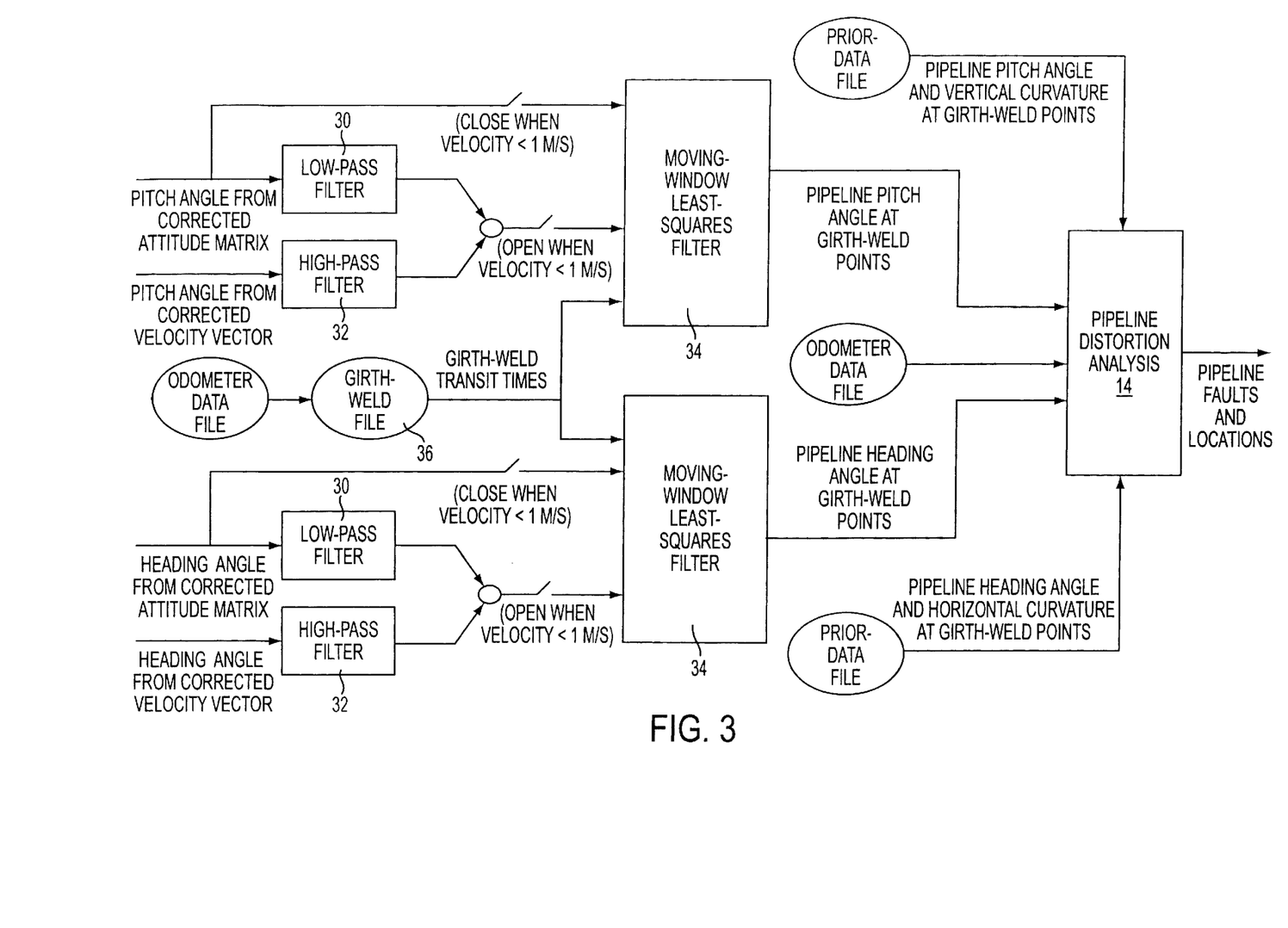
FIG. 3 shows a block diagram of the filtering and analysis performed on the pitch, heading angles from the attitude and distance data to locate faults in the pipeline.

The off-line postprocessing consists of five major parts, as depicted in FIGS. 2 and 3, and summarized as follows:

Inertial Navigation Solution—The IMU gyro and accelerometer data are integrated to provide a navigation solution in the North/East/Down frame consisting of an attitude matrix and a 3-dimensional velocity vector. Each gyro output consists of a sequence of incremental attitude angles, and each accelerometer output consists of a sequence of incremental velocities. This operation is carried out at a nominal 50-hz iteration rate.

Kalman Filter 12—Since the navigation solution consisting of the inertially derived attitude matrix and velocity vector will be degraded over time due to sensor biases and random noise, aiding information must be periodically incorporated to correct the navigation solution. The correction applied to the solution is derived using an optimal filtering approach, which utilizes information derived from the odometer 4. The optimal filter 12 produces corrections to the PIG attitude matrix and velocity vector, and an estimate of the odometer scale factor and boresight errors. This operation is carried out at a nominal iteration interval of 2 to 5 seconds for odometer measurement processing.

Attitude Matrix and Velocity Vector Correction—The attitude matrix of the pipeline relative to a geographic (NED) frame requires that the attitude of the IMU 2 relative to this same frame be corrected for two angular offsets—a static offset due to the misalignment of the IMU axes relative to the PIG axes, and a dynamic offset of the PIG 1 relative to the pipeline that occurs during pipeline bends. The velocity vector is corrected for the known lever arm between the IMU 2 and the PIG 1 center of gravity, so that it will be free of PIG angular motion effects.

Blending Filter—The attitude of the pipeline, as determined from the corrected attitude matrix, and from the corrected velocity vector, are blended using a complementary filter. Together with a second moving-window least-squares filtering stage, the best estimate of the pipeline to local-vertical attitude is derived.

Pipeline Distortion Analysis 14—Once the best estimate of the pipeline attitude is available, a comparison with prior attitude information allows an assessment of the pipeline geometric stability, and the need for remedial action if warranted.

The functional modules that make up the data postprocessing concept implicit in FIGS. 2 and 3 are defined in greater detail below.

A concept for pipeline distortion monitoring is shown in FIGS. 1 and 2. The scheme assumes that an Inertial Measurement Unit (IMU) 2, well known in this area of technology, is available that provides the gyro and accelerometer outputs which allow an attitude matrix and a velocity vector to be computed. Gyro and accelerometer outputs are taken from the IMU 2 and with a set of initial conditions, an initial attitude matrix and an initial velocity vector, an attitude reference matrix and a velocity vector are provided. The computations to determine the attitude reference matrix and velocity vector are performed in the Attitude Reference Matrix Determination means 20 and the Velocity Vector Determination means 22 in FIG. 2. In general, additional information provided by an odometer 4 may be used to aid the inertial navigation solution so that the best estimate of PIG attitude and velocity will result.

In general terms, an inertial navigation system functions by continuously measuring the components of vehicle nongravitational acceleration and angular velocity in three orthogonal sensor reference axes and, simultaneously, integrates the set of differential equations defining vehicle attitude, velocity, and position that have these measurements as inputs. The errors in the navigator's outputs arise principally from three sources: initial condition errors, errors in the inertial sensor measurements, and errors associated with the assumed earth gravity model.

In the pipeline surveying application, the strapdown solution, as expressed in a North/East/Down (NED) coordinate frame, is defined by an attitude matrix that provides the transformation between the sensor reference frame and the NED frame, and a velocity vector. The equations solved in the Navigation Equation Module are the following:

$$\dot{C} = C\{\omega\} - \{\Omega + \rho\}C \quad (1)$$

$$\dot{V} = CA - \{2\Omega + \rho\}V + g \quad (2)$$

where
C=transformation matrix from sensor reference frame to local-vertical NED frame, with initial condition C(0)
V=velocity vector in NED frame, with initial condition V(0)
$\Omega$=angular velocity vector of earth with respect to the inertial frame
$\rho$=angular velocity of local-vertical frame with respect to the earth reference frame
$\omega$=angular velocity vector of sensor reference frame with respect to the inertial frame
A=nongravitational acceleration vector of vehicle
g=plumb-bob gravity vector and the convention is used here and throughout that a quantity of the form, $\{v\}$, denotes the skew-symmetric matrix formed from the components, $v_i$, of the enclosed vector, v. The earth rate and transport rate vectors are computed via:

$$\Omega = \begin{bmatrix} \Omega_n \\ \Omega_e \\ \Omega_d \end{bmatrix} = \begin{bmatrix} \omega_e \cos\lambda \\ 0 \\ -\omega_e \sin\lambda \end{bmatrix} \quad (3)$$

$$\rho = \begin{bmatrix} \rho_n \\ \rho_e \\ \rho_d \end{bmatrix} = \begin{bmatrix} V_e/(\mu_e + h) \\ -V_n/(\mu_n + h) \\ -V_e \tan\lambda/(\mu_e + h) \end{bmatrix} \quad (4)$$

where
$V_n, V_e, V_d$=North,/East/Down velocity components
$\Omega_n, \Omega_e, \Omega_d$=earth-rate components in NED frame
$\rho_n, \rho_e, \rho_d$=transport-rate components in NED frame
$\omega_e$=earth's rotation rate relative to an inertial frame of reference
$\lambda$=geodetic latitude
$\mu_n, \mu_e$=earth's principal radii of curvature in North and East directions
h=altitude Corrections to the attitude matrix and the velocity vector are performed to produce the most accurate attitude matrix and velocity vector possible. A boresight angle correction is used to provide an accurate attitude matrix. The boresight angle correction provides the angular offset between the IMU 2 and the inspection vehicle (PIG) longitudinal axis. The correction is performed in the Correct Attitude Matrix for Offset Angle means 23 and 25, for a fixed offset angle as well as for a dynamic offset angle, and a corrected attitude matrix is output. A lever arm correction is applied to the velocity vector to determine a corrected velocity vector. This correction is performed by a Correct Velocity Vector for Lever Arm means 24. These corrections will be discussed in more detail later in this detailed description. In addition to these corrections, the velocity vector is also sent to a Kalman Filter 12.

The function of the Kalman Filter 12 is to process measurements consisting of the difference between quantities derived from an odometer 4, and the corresponding quantities derived from the navigation solution. The Kalman Filter 12 structure is such that all information is blended (i.e., integrated) in an optimal fashion, and is closely related to the more familiar concept of recursive least-squares estimation. Effective use of the Kalman Filter 12 requires knowledge of the following important elements:

A model for the dynamic variations in the state (in the case of interest here, the errors in the inertial navigation solution for attitude and velocity). This takes the form of a set of differential or difference equations A model for the constant and random errors that act as the forcing functions to the dynamic state (in the case of interest here, gyro and accelerometer biases and random-walk errors)

A model for the constant and random errors that appear in the aiding information (in the case of interest here, the errors in the odometer scale-factor, boresight, and random slippage errors).

The outstanding attribute of the Kalman Filter 12 is that it allows all of the above elements to be accounted for in a very systematic and formalized way which makes it ideal for implementation in a digital computer. The following discussion summarizes the steps implicit in the implementation of the Kalman Filter 12.

Consider a system whose behavior is defined by the following set of discrete linear equations:

$$X_n = \Phi_n X_{n-1} + B_n \eta_n \qquad (5)$$

where

X=vector of states

η=vector of random (zero-mean) noise sequences $\Phi_n$=state transition matrix from $^{(n-1)th}$ to $n^{th}$ update points $B_n$=noise distribution matrix For a given Φ and B, the state X will have a time variation determined by the particular noise sequence, η, and initial condition, $X_0$, which in general is taken to be a randomly distributed quantity. Since the noise sequence, $\eta_n$, has an infinite number of realizations, and the initial condition error can assume an infinite number of values, the system given by equation (5) has an infinite number of solutions. Because this is true, attention must be focused on the statistical behavior of equation (5) rather than on specific solutions.

The most natural and useful way of characterizing the behavior of equation (5) is to compute the statistical parameters that define the bounds on the state vector, X. The statistical bounds on the components of X are found by solving the covariance matrix equation associated with equation (5), which takes the recursive form:

$$P_n = \Phi_n P_{n-1} \Phi_n^T + B_n Q_n B_n^T \qquad (6)$$

where P is the error covariance matrix of the state vector, X, defined explicitly by:

P=[$P_{ij}$]

and $P_{ij}=E(x_i x_j)$ in which E denotes the expectation operator. It is seen that the individual variances of the components of X are defined by the diagonal elements of P, with the joint expectations being defined by off-diagonal elements of P. The matrix Q in equation (6) is the covariance matrix of the driving noise vector, A, defined by:

Q=[$q_{ij}$]

in which $q_{ij}=E(\eta_i \eta_j)$

Consider the case where the discrete process defined by equation (5) represents the true dynamic propagation characteristics associated with a given linear system. For this case, assume that a measurement is made at the $n^{th}$ measurement update time employing an external measuring device which allows a specific linear combination of the states to be directly monitored. A general way of stating this in mathematical terms is as follows:

$$y_n = H_n X + \xi_n \qquad (7)$$

where $y_n$=vector of measurements $H_n$=measurement matrix at $n^{th}$ measurement update time $\xi_n$=measurement noise vector applicable to $n^{th}$ measurement and it is assumed that, in the general case, a number of independent measurements may become available simultaneously.

The optimal utilization of information introduced through a series of measurements of the form given by equation (7), to estimate the state vector X in a sequential fashion, is the central problem addressed by Kalman estimation theory, and has the following solution. After each measurement (of a sequence of measurements), the estimate of the state, X, is refreshed by the two-step procedure:

$$\hat{X}_n^- = \Phi_n \hat{X}_{n-1} \qquad (8)$$

$$\hat{X}_n = \hat{X}_n^- + K_n[y_n - H_n \hat{X}_n^-] \qquad (9)$$

where $\hat{X}_n^-$=optimal estimate of vector X just before the $n^{th}$ measurement is processed $\hat{X}_n$=optimal estimate of vector X immediately after $n^{th}$ measurement is processed $K_n$=Kalman gain matrix at $n^{th}$ measurement update with $K_n$ defined by $$K_n = P_n^- H_n^T (H_n P_n^- H_n^T + R_n)^{-1} \qquad (10)$$

in which $P_n^-$=apriori error covariance matrix of vector X $R_n$=measurement noise error covariance matrix and the apriori error covariance matrix, $P_n^-$, is computed from (6) over the interval $t_{n-1}$ to $t_n$.

After processing the $n^{th}$ measurement, the error covariance matrix of the state X is modified to reflect the benefit of incorporating new information introduced by the measurement, by means of:

$$P_n = (I - K_n H_n) P_n^- \qquad (11)$$

where $P_n$ is the aposteriori error covariance matrix. The form given by equation (11) is applicable when the Kalman Filter 12 is fully optimal or, rather, when it is a full-state filter in which all components of X are fully accounted for in the mathematical model and, further, are re-estimated after each successive measurement is made available.

The second major element that needs to be specified in defining a Kalman Filter 12 are the measurement equations, and the measurement matrix H. These then make the Kalman Filter 12 unique to the PIG application of interest here. The measurement relationships are defined by odometer aiding data. The odometer 4 is a device that measures distance traveled via the observed incremental rotations of one or more precisely machined wheels. The odometer 4 yields directly a measurement of the incremental distance traveled, along an arc length of the pipeline, over a given time interval. However, two other implicit measurements that are commonly utilized in odometer-based systems account for the fact that, in an average sense, the vehicle experiences no net motion in the lateral and normal directions, but only in the axial direction. These two additional measurements are commonly referred to as "zero side-slip" and "zero up-slip" measurements. For the set of three measurements (axial, lateral and normal) the difference is formed with respect to the inertially-derived values of these same quantities.

The nominally defined odometer output vector is modified in the following manner to account for known corrections for odometer scale factor and boresight errors $$\Delta \hat{s}_n = \begin{bmatrix} (1-\hat{k}) \\ \hat{\alpha}_0 \\ \hat{\beta}_0 \end{bmatrix} \Delta s_n \quad (12)$$

where $\Delta \hat{s}_n$=corrected incremental odometer output vector
$\hat{k}$=odometer scale factor correction
$\hat{\alpha}_0, \hat{\beta}_0$=odometer boresight corrections with the odometer scale-factor and boresight corrections being derived by the optimal filtering process. The odometer-derived distance traveled over a measurement update interval may be compared to the analogous quantity derived from the inertial navigation solution to yield the following set of measurements $$y = \begin{bmatrix} y_1 \\ y_2 \\ y_3 \end{bmatrix} = \begin{bmatrix} \int_{t_{j-1}}^{t_j} V \cdot U_1^{IMU} dt - \Delta s_j \\ \int_{t_{j-1}}^{t_j} V \cdot U_2^{IMU} dt \\ \int_{t_{j-1}}^{t_j} V \cdot U_3^{IMU} dt \end{bmatrix} \quad (13)$$

where V is the inertially derived velocity vector, and the $U_i^{IMU}$ are unit vectors defining the IMU axes, and which are directly defined by the columns of the direction cosine matrix C.

Each measurement will have a nominal value of zero, but in actuality will have a nonzero value due to the residual errors in the information entering the measurement relationship, and the measurement noise itself. A discretized set of odometer measurement error equations suitable for use in the Kalman Filter 12, that accounts for the direct along-track measurement of incremental distance traveled, and the implicit zero side-slip and zero up-slip measurements, is defined by $$y_1 = s_{11} \delta V_n(j) + s_{12} \delta V_e(j) + s_{13} \delta V_d(j) + k \Delta s(j) + \xi_1(j) \quad (14)$$

$$y_2 = s_{12} \delta V_n(j) + s_{22} \delta V_e(j) + s_{32} \delta V_d(j) + \alpha_0 \Delta s(j) + \xi_1(j) + g_{13} \psi_n(j) + g_{23} \psi_e(j) + g_{33} \psi_d(j) \quad (15)$$

$$y_3 = s_{13} \delta V_n(j) + s_{23} \delta V_e(j) + s_{33} \delta V_d(j) + \beta_0 \Delta s(j) + \xi_3(j) - g_{12} \psi_n(j) + g_{22} \psi_e(j) + g_{32} \psi_d(j) \quad (16)$$

where the $s_{ij}$ and $g_{ij}$ are defined by $$s_{ij} = \int_{t_{j-1}}^{t_j} c_{ij} dt$$

$$g_{ij} = \int_{t_{j-1}}^{t_j} \dot{s} c_{ij} dt$$

and in which $y_1$=error in axial measurement (difference between the integrated axial inertial velocity, and incremental odometer output over the $j^{th}$ measurement interval)

$y_2$=error in lateral measurement (difference between the integrated lateral inertial velocity, and the nominally zero value for this quantity, over the $j^{th}$ measurement interval)

$y_3$=error in normal measurement (difference between the integrated normal inertial velocity, and the nominally zero value for this quantity, over the jth measurement interval)

$\xi_1(j), \xi_2(j), \xi_3(j)$=random measurement errors in $y_1$, $y_2$, and $y_3$ $\psi_n(j), \psi_e(j), \psi_d(j)$=components of attitude error vector
$\delta V_n(j), \delta V_e(j), \delta V_d(j)$=components of velocity error vector
k=odometer scale factor error
$\dot{s}$ odometer-derived speed along arc of PIG trajectory
$\alpha_0, \beta_0$=boresight errors in lateral and normal directions
$c_{ij}$=elements of attitude matrix
$t_j$=time corresponding to the end of the measurement interval
$t_{j-1}$=time corresponding to the start of the measurement update
$\Delta s$=along-track incremental distance traveled over measurement time interval The set of three measurements are processed by the Kalman Filter 12 at a time interval on the order of 5 seconds, during which time the PIG 1 will have traveled a distance on the order of 15 to 20 meters. In addition to making the attitude and velocity errors observable, the odometer scale factor and boresight errors, $\alpha_0$ and $\alpha_0$, are also made observable by means of the odometer aiding data. This allows the attitude and velocity vector to be continuously corrected, and the scale-factor and boresight corrections to also be applied. In addition, the boresight errors are used to correct the IMU 2 to local vertical attitude matrix to allow the pipeline to local vertical transformation matrix to be derived, as discussed below.

The pipeline attitude may be expressed in terms of a pitch angle relative to a horizontal plane, and a heading angle relative to a true North direction. The pitch and heading angles are determined for the corrected attitude matrix 26 and the corrected velocity vector 28. This determination is performed in the PIG pitch and heading determination means from the attitude matrix and velocity vector respectively as shown in FIG. 2. The pitch and heading angles, which may be derived directly from the elements of the attitude matrix after correcting for the known boresight errors, are computed from the following equations:

$$\theta_A = \sin^{-1}(-c_{31}) \quad (17)$$

$$\psi_A = \tan^{-1}(c_{21}/c_{11}) \quad (18)$$

where $\theta_A$=estimate of pipeline pitch angle derived from attitude matrix $\psi_A$=estimate of pipeline heading angle derived from attitude matrix and the $c_{ij}$ are the elements of the corrected inertially-derived attitude matrix.

FIG. 2 also shows how a second measure of the pitch and heading angles of the pipeline inspection vehicle 1 is derived from the velocity vector. The velocity vector applies to the point on the inspection vehicle 1 at which the IMU 2 is located.

Therefore, an additional component of velocity results from PIG angular motion acting through a fixed lever arm from the PIG center of gravity to the IMU 2. This additional velocity component must be removed to obtain the velocity components of the PIG center of gravity. Once the corrected velocity vector is obtained, the PIG pitch and heading angles may be obtained directly from its components. The pitch and heading angles are computed from:

$$\theta_V = \sin^{-1}[-V_d/(V_n^2+V_e^2)^{1/2}] \quad (19)$$

$$\psi_V = \tan^{-1}(V_e/V_n) \quad (20)$$

where $\theta_V$=estimate of pitch angle derived from velocity vector $\psi_V$=estimate of pipeline heading angle derived from velocity vector and $V_n$, $V_e$ and $V_d$ are the North, East and Down velocities, computed from the corrected inertially-derived velocity vector.

The pitch angle and heading angle are filtered by a low pass filter 30 for the attitude matrix angles and the velocity vector angles are filtered with a high pass filter 32 as shown in FIG. 3. The filtered pitch angles are then blended together and the filtered heading angles are blended together. FIG. 3 shows how the pitch and heading angles derived by the two means defined in FIG. 2 may be combined to obtain the best estimate of the pipeline orientation at all points along the course of the pipeline. The scheme defined in FIG. 3 uses a complementary filtering approach to blend the two sources of pitch-angle information, and the two sources of heading-angle information. The complementary filter low-passes the pitch-angle information derived from the PIG attitude matrix, and high-passes the pitch-angle information from the PIG velocity vector, and then combines the two results or, explicitly $$\hat{\theta} = \left(\frac{1}{\tau S+1}\right)\theta_A + \left(\frac{\tau S}{\tau S+1}\right)\theta_V \quad (21)$$

$$\hat{\psi} = \left(\frac{1}{\tau S+1}\right)\psi_A + \left(\frac{\tau S}{\tau S+1}\right)\psi_V \quad (22)$$

where $\hat{\theta}$=blended estimate of pipeline pitch angle $\hat{\psi}$=blended estimate of pipeline heading angle $\tau$=time constant (on order of 1–2 seconds)

S=Laplace complex variable

The filters use these equations which are then combined by the summing node.

Another stage of filtering is applied via a moving-window least-squares filter 34 that removes any remaining spurious high-frequency angular motions. The moving-window filter 34 derives a least-squares fit to the angle data over a fixed window size (on the order of ½ to 1 second, typically with 50-hz samples being used in the process). A Moving Window Least Squares (MWLS) Filter 34 is used to provide filtering so that any spurious high frequency angular motions are filtered out. The MWLS filter 34 also uses information from a girth weld file 36 which provides girth weld times used to specify a sequence of points along the pipeline at which the pitch and heading angles are identified and stored for pipeline distortion analysis. After the MWLS filter 34, the pitch angle and heading angle at the girth weld points are determined. This information is sent to the Pipeline Distortion Analysis means 14 to accurately determine pipeline distortions and locations.

The complementary filtering concept takes advantage of the natural dynamic behavior of the PIG 1 as it traverses the pipeline. When, for example, the PIG 1 is traveling on essentially a straight line, its pitch and heading angles will manifest damped oscillatory excursions about the nominal values as a result of excitation by girth welds and other pipeline irregularities. The oscillatory motion will be at a relatively high frequency, which is determined by the spring-mass system of the PIG mechanical suspension. This extraneous motion will be registered in the pitch and heading angles derived from the attitude matrix. However, this high-frequency (2–3 hz) angular motion will be highly attenuated in the blended solution, and so will have very little effect on system accuracy. Consider a second case of interest, which occurs when the pipeline is changing direction in either a horizontal plane, or a vertical plane, or both planes simultaneously. When such is true, the centripetal acceleration associated with the pipeline bend will generally cause the PIG attitude to develop pitch and heading offsets that are dependent on speed and the curvature of the pipeline. The steady-state pitch and heading offsets may be defined, using a simple spring-mass mechanical model for the PIG angular motion, as follows:

$$\beta_d = -\left(\frac{Wd}{gk}\right)A_3^b = -C_d A_3^b \quad (23)$$

$$\alpha_d = \left(\frac{Wd}{gk}\right)A_2^b = C_d A_2^b \quad (24)$$

where $\alpha_d, \beta_d$=steady-state angular offsets occurring during a pipeline bend, measured about the PIG normal and lateral axes, respectively $A_2^b, A_3^b$=lateral and normal nongravitational acceleration components measured by accelerometers d=distance that PIG center of gravity is forward of PIG center of es IS suspension k=compliance of suspension W=weight of PIG g=acceleration due to gravity and the constant $C_d$ is defined by $$C_d = \frac{Wd}{gk} \quad (25)$$

The constant, $C_d$, determines how the PIG 1 will develop an angular offset during pipeline bends, and needs to be calibrated in order that the attitude matrix may be corrected for this dynamic effect. The means by which this may be accomplished is to monitor the PIG attitude as it traverses a particular pipeline bend at various speeds on a specially designated test course. Then, since the attitude change in the PIG orientation is proportional to the square of the velocity, the constant of proportionality, $C_d$, for the PIG 1 (or a PIG generic type) may be determined by a simple curve fit approach. More explicitly, the vertical and horizontal non-gravitational acceleration components occurring during pipeline bends, $A_V$ and $A_H$, respectively, will vary according to $$A_V = \frac{V^2}{R_V} \quad (26)$$

$$A_H = \frac{V^2}{R_H} \quad (27)$$

where V is the PIG velocity, and $R_V$ and $R_H$ are the pipeline instantaneous radii of curvature measured along the vertical and horizontal directions, respectively. Given the spring-mass model of the PIG suspension system, the maneuver-induced pitch and heading changes of the PIG attitude will be proportional to the vertical and horizontal accelerations, respectively, or explicitly $$\Delta\theta = C_d A_V \quad (28)$$

$$\Delta\psi = C_d A_H \quad (29)$$

where $\Delta\theta$, $\Delta\psi$ = PIG maneuver induced pitch and heading changes Therefore, by running the PIG 1 through the same bend at a number of distinct speeds, the proportionality constant, $C_d$, may be determined and subsequently used in deriving the dynamic offset angles, $\alpha_d$ and $\beta_d$, as defined by equations (23) and (24).

Once the fixed and dynamic offset angles are known, the attitude matrix may be corrected to allow the pipeline to local-vertical transformation matrix to be derived.

The attitude matrix, as computed by the inertial solution, provides the transformation matrix defined by $$\begin{bmatrix} U_1^{LV} \\ U_2^{LV} \\ U_3^{LV} \end{bmatrix} = C_{IMU}^{LV} \begin{bmatrix} U_1^{IMU} \\ U_2^{IMU} \\ U_3^{IMU} \end{bmatrix} \quad (30)$$

where $C_{IMU}^{LV}$ is the IMU-to-local-vertical transformation matrix [from the solution of (1)], and the unit vectors are defined by $U_1^{IMU}, U_2^{IMU}, U_3^{IMU}$ = unit-vector triad defining the orthogonal IMU reference frame $U_1^{LV}, U_2^{LV}, U_3^{LV}$ = unit-vector triad defining the local-vertical (NED) reference frame The transformation matrix from the IMU to PIG frames, $C_{IMU}^{PIG}$, is given by $$\begin{bmatrix} U_1^{PIG} \\ U_2^{PIG} \\ U_3^{PIG} \end{bmatrix} = C_{IMU}^{PIG} \begin{bmatrix} U_1^{IMU} \\ U_2^{IMU} \\ U_3^{IMU} \end{bmatrix} \quad (31)$$

in which the following unit vector is defined $U_1^{PIG}, U_2^{PIG}, U_2^{PIG}$ = unit-vector triad defining the orthogonal PIG body reference frame The attitude matrix, $U_{PIG}^{Pipe}$, from the PIG to pipeline is defined by $$\begin{bmatrix} U_1^{Pipe} \\ U_2^{Pipe} \\ U_3^{Pipe} \end{bmatrix} = C_{PIG}^{Pipe} \begin{bmatrix} U_1^{PIG} \\ U_2^{PIG} \\ U_3^{PIG} \end{bmatrix} \quad (32)$$

in which the following unit vector is defined $U_1^{Pipe}, U_2^{Pipe}$, $U_3^{Pipe}$ = unit-vector triad defining the orthogonal pipeline reference frame From (30), (31) and (32), the transformation between the pipeline and local-vertical frames is expressed as $$\begin{bmatrix} U_1^{LV} \\ U_2^{LV} \\ U_3^{LV} \end{bmatrix} = C_{IMU}^{LV}(C_{IMU}^{PIG})^T(C_{PIG}^{Pipe})^T \begin{bmatrix} U_1^{Pipe} \\ U_2^{Pipe} \\ U_3^{Pipe} \end{bmatrix} = C_{Pipe}^{LV} \begin{bmatrix} U_1^{Pipe} \\ U_2^{Pipe} \\ U_3^{Pipe} \end{bmatrix} \quad (33)$$

which defines the transformation, $C_{Pipe}^{LV}$, between the pipeline and the local-vertical North/East/Down reference frame as $$C_{Pipe}^{LV} = C_{IMU}^{LV}(C_{IMU}^{PIG})^T(C_{PIG}^{Pipe})^T \quad (34)$$

The transformation matrix between the IMU frame and the PIG body frame is a function of the two fixed offset angles $\alpha_0$ and $\beta_0$ or, explicitly $$C_{IMU}^{PIG} = \begin{bmatrix} 1 & -\alpha_0 & \beta_0 \\ \alpha_0 & 1 & 0 \\ -\beta_0 & 0 & 1 \end{bmatrix} \quad (35)$$

The transformation matrix between the PIG frame and the pipeline frame is a function of the two dynamic offset angles $\alpha_d$ and $\beta_d$ or, explicitly $$C_{PIG}^{Pipe} = \begin{bmatrix} 1 & -\alpha_d & \beta_d \\ \alpha_d & 1 & 0 \\ -\beta_d & 0 & 1 \end{bmatrix} \quad (36)$$

Equations (28) and (29) show that when the PIG 1 is traversing either a straight pipeline segment, or a segment with a large radius of curvature, or is traveling at a reduced speed, the low-frequency components of the PIG pitch and heading variations will be small and, consequently, will not corrupt the blended solution (which allows all low-frequency components from the attitude solution for pitch and heading to pass unattenuated). In contrast, the pitch and heading angles derived from the velocity vector will generally degrade in accuracy as the PIG velocity is reduced. This is true because the natural errors in the computed PIG velocity will constitute a larger percentage of the true velocity, and this will be manifested in larger pitch and heading errors for reduced PIG velocities. As noted in FIG. 3, the complementary filtering scheme incorporates logic which causes the pitch and heading angles derived from the attitude matrix to be used exclusively at low PIG speeds (say less than 1 meter/sec). In addition, the velocity vector as derived from the IMU data processing must be corrected to account for the offset between the PIG center of gravity and the IMU location. This is accomplished by implementing the following correction equation:

$$V_{cg} = V_{IMU} + \omega \times r \quad (37)$$

where $V_{cg}$=PIG velocity vector at its center of gravity $V_{IMU}$=PIG velocity vector measured at the IMU location $\omega$=PIG angular velocity vector measured by the gyro triad r=lever arm between PIG center of gravity and IMU location Once the corrected PIG pitch and heading angles are available, they may be blended to arrive at the best estimate of the pipeline-to-local-vertical attitude. The use of the blended PIG pitch and heading angles at the girth-weld points may be used to detect pipeline distortions by three means, as follows:

(1) Change in average pipeline curvature across each pipeline segment from some past epoch to the present
(2) Change in the cumulative pitch- and heading-angle changes at each girth-weld point from the past epoch to the present time
(3) Change in cumulative position change of each girth-weld point from the past epoch to the present time.

Each of these three methods of detecting pipeline distortions is carried out in the Pipeline Distortion Analysis means 14 in FIG. 3.

The pitch- and heading-angle changes across successive girth welds, divided by the distance traveled by the PIG 1 over the same interval (as determined from odometer data), directly determine the two average pipeline curvature parameters, given by $$C_V(n) = \frac{\hat{\theta}_n - \hat{\theta}_{n-1}}{s_n - s_{n-1}} \quad (38)$$

$$C_H(n) = \frac{\hat{\psi}_n - \hat{\psi}_{n-1}}{s_n - s_{n-1}} \quad (39)$$

where $C_V(n)$ average curvature in the vertical plane over the $n^{th}$ pipeline segment $C_H(n)$=average curvature in a horizontal plane over the $n^{th}$ pipeline segment $\hat{\theta}_n$=blended pitch angle at the $n^{th}$ girth-weld point $\hat{\psi}_n$=V blended heading angle at the $n^{th}$ girth-weld point $s_n$=total distance traveled up to the $n^{th}$ girth-weld point (from odometer)

Another feature of the scheme is the use of girth-weld data consisting of the times associated with the successive PIG traversal of each girth weld of the pipeline network. The girth-weld times are used to specify a sequence of points along the pipeline at which its pitch and heading angles are identified and stored for pipeline distortion analysis. Comparison of the pipeline curvatures over each pipeline segment defined by successive girth-welds points, in comparison to those derived at an earlier epoch, provides an effective means of pipeline distortion monitoring.

In addition to pipeline curvature shifts over time, which identifies distortions occurring over relatively short spans, the cumulative pipeline pitch- and heading-angle changes at girth-weld points may be compared. This provides a means of detecting distortions that effect a relatively large span of the pipeline. The difference in the cumulative pipeline pitch- and heading-angle changes between two successive pipeline surveys may be determined from $$\Delta\Theta_n = \Theta_n - \Theta_n' \quad (40)$$

$$\Delta\Psi_n = \Psi_n - \Psi_n' \quad (41)$$

where $\Theta_n$ and $\Psi_n$ are the cumulative changes in pipeline pitch and heading angles from the start of the present pipeline survey, and $\Theta_n'$ and $\Psi_n'$ are the analogous quantities for the prior pipeline survey—these four quantities being defined by $$\Theta_n = \sum_{j=1}^{n}(\hat{\theta}_j - \hat{\theta}_{j-1}) \quad \Theta_n' = \sum_{j=1}^{n}(\hat{\theta}_j' - \hat{\theta}_{j-1}')$$

$$\Psi_n = \sum_{j=1}^{n}(\hat{\psi}_j - \hat{\psi}_{j-1}) \quad \Psi_n' = \sum_{j=1}^{n}(\hat{\psi}_j' - \hat{\psi}_{j-1}')$$

Distortions of the pipeline may also be identified by cumulative shifts in the geographic positions of the girth-weld points. This provides a useful quantitative measure of the cumulative amount of pipeline movement, useful for identifying pipeline configuration changes over intermediate and long spans of the pipeline. The concept here is to utilize the blended pipeline pitch and heading angles for both the current and prior pipeline traverses, in conjunction with the odometer readings at the girth-weld points, in an integration process that provides the cumulative change in the pipeline position. The processing equations are defined as follows:

$$\Delta N(n) = \quad (42)$$
$$-\sum_{j=1}^{n}(s_j - s_{j-1})\left[\sin\tilde{\Psi}_j\cos\tilde{\Theta}_j(\tilde{\Psi}_j - \tilde{\Psi}_j') + \cos\tilde{\Psi}_j\sin\tilde{\Theta}_j(\tilde{\Theta}_j - \tilde{\Theta}_j')\right]$$

$$\Delta E(n) = \sum_{j=1}^{n}(s_j - s_{j-1})\left[\cos\tilde{\Psi}_j\cos\tilde{\Theta}_j(\tilde{\Psi}_j - \tilde{\Psi}_j') - \sin\tilde{\Psi}_j\sin\tilde{\Theta}_j(\tilde{\Theta}_j - \tilde{\Theta}_j')\right] \quad (43)$$

$$\Delta H(n) = \sum_{j=1}^{n}(s_j - s_{j-1})\left[\cos\tilde{\Theta}_j(\tilde{\Theta}_j - \tilde{\Theta}_j')\right] \quad (44)$$

where $\Delta N(n), \Delta E(n), \Delta H(n)$=cumulative North, East, Altitude shift in pipeline at the $n^{th}$ girth-weld point and in which the following relationships define the average values utilized in (42), (43), and (44)

$$\tilde{\Theta}_j = \frac{\Theta_j + \Theta_{j-1}}{2} \quad \tilde{\Theta}_j' = \frac{\Theta_j' + \Theta_{j-1}'}{2}$$

$$\tilde{\Psi}_j = \frac{\Psi_j + \Psi_{j-1}}{2} \quad \tilde{\Psi}_j' = \frac{\Psi_j' + \Psi_{j-1}'}{2}$$

The cumulative pipeline position shift, expressed in track/cross-track directions, may be of greater usefulness in establishing the nature of the pipeline distortion and the need for remedial maintenance action. This cumulative pipeline position shift expressed in track/cross-track directions is given by $$\begin{bmatrix} \Delta T(n) \\ \Delta C(n) \end{bmatrix} = \begin{bmatrix} \cos\hat{\psi}_n & \sin\hat{\psi}_n \\ -\sin\hat{\psi}_n & \cos\hat{\psi}_n \end{bmatrix} \begin{bmatrix} \Delta N(n) \\ \Delta E(n) \end{bmatrix} \quad (45)$$

where $\Delta T(n), \Delta C(n)$=cumulative track/cross-track pipeline position shift at the $n^{th}$ girth-weld point The pipeline distortion-monitoring scheme, as defined in FIG. 3, is predicated on the ability to make comparisons of the present and prior geometrical parameters of the pipeline at its discrete girth-weld points. This is made possible via the girth-weld file shown in FIG. 3, which contains the cumulative odometer-derived distance traveled at each girth-weld point. A number of techniques are possible that allow this file to be generated for a given pipeline. In one possible approach, the transit time of each girth weld is detected by the dynamic effect the girth weld produces on the PIG angular motion, as sensed by the cluster of inertial sensors, and refined by signal processing techniques. A second possible approach is by utilizing inspection data acquired during the PIG run, which allows each girth weld to be recognized by either optical or magnetic means, in a manner consistent with that normally utilized in inspecting the inner surface of the pipeline for corrosion and weld integrity.

The invention has been described herein in detail in order to comply with the Patent Statutes and to provide those skilled in the art with the information needed to apply the novel principles and to construct and use such specialized processes and components as are required. However, it is to be understood that the invention can be carried out by specifically different processes and components, and that various modifications, both as to the processing details and operating procedures, can be accomplished without departing from the scope of the invention itself.

The embodiments of the invention in which an exclusive property or right is claimed are defined as follows:

1. A pipeline monitoring system, comprising:
   a pipeline pig;
   an inertial measurement unit located in the pig;
   means for calculating pig attitude data based on output from the inertial measurement unit;
   means for calculating pig velocity data based on output from the inertial measurement unit;
   at least one filter for blending the pig attitude data and pig velocity data to provide accurate pipeline attitude data;
   means for analyzing features of a pipeline based on the accurate pipeline attitude data, and assessing any pipeline distortions and locations of the distortions.

2. The pipeline monitoring system of claim 1 wherein the inertial measurement unit, comprises:
   a triad of gyros outputting a sequence of incremental attitude data; and
   a triad of accelerometers outputting a sequence of velocity data.

3. The pipeline monitoring system of claim 1 wherein at least one filter is a Kalman filter producing optimal corrections to the attitude and velocity data.

4. The pipeline monitoring system of claim 1, further comprising an odometer that yields incremental distance traveled along the pipeline over a period of time and aids in correcting the attitude and velocity data.

* * * * *